United States Patent [19]
Endres

[11] Patent Number: 5,307,698
[45] Date of Patent: May 3, 1994

[54] VERTICAL MEASUREMENT SYSTEM

[76] Inventor: Thomas E. Endres, 25383 Carollton, Farmington Hills, Mich. 48335

[21] Appl. No.: 994,764

[22] Filed: Dec. 22, 1992

[51] Int. Cl.$^5$ .............................. G01C 5/00; E02F 3/28
[52] U.S. Cl. .................................... 73/865.2; 37/413
[58] Field of Search .................... 73/865.2, 865.9, 299; 37/906, 413

[56] References Cited

U.S. PATENT DOCUMENTS

| | | | |
|---|---|---|---|
| 2,851,799 | 9/1958 | Meents et al. | 73/865.2 X |
| 3,236,535 | 2/1966 | Barber | 73/865.2 X |
| 3,494,202 | 2/1970 | Comey | 73/865.2 |
| 3,724,278 | 4/1973 | Harland | 73/865.2 |
| 3,779,084 | 12/1973 | Nilsson | 73/865.2 |
| 3,815,423 | 6/1974 | Gearhart | 73/865.2 |
| 4,356,639 | 11/1982 | Opazo | 73/865.2 X |
| 4,452,078 | 6/1984 | Formanek et al. | 73/865.2 |
| 5,167,155 | 12/1992 | Rodgers | 73/299 |

*Primary Examiner*—Tom Noland

[57] ABSTRACT

The pressure atop a fluid filled flexible column, with the top end in a fixed position, is electronically measured and the result is utilized to indicate the vertical distance between points of interest. Associated electronics plus a suitable display, indicates the vertical distance between the points. As the lower end of the flexible fluid column is moved, the display continuously indicates the vertical distance relative to a reference point. The points of interest (one being a reference point) are measured by placing the opposite end of the flexible column on those points. As applied to a backhoe or excavator, the fluid filled flexible column is adhered to the boom and stick (major moving members of the equipment) and thereby furnishes the equipment operator the vertical position of the bucket (cutting edge of the equipment) compared to an established reference. The system continuously displays the relative vertical position of the bucket without the operator having to actuate any switch or valve. The display furnishes direct information to the operator, no manual calculations are required.

6 Claims, 7 Drawing Sheets

VERTICAL MEASUREMENT SYSTEM

BACKGROUND and FIELD OF THE INVENTION

This invention relates to an improved system to indicate the vertical distance between points, and more particularly to a system that displays the vertical distance between points by means of sensing the pressure difference atop a fluid column through circuitry employing an electronic pressure sensor or sensors.

SUMMARY OF THE INVENTION

According to one aspect of the invention, a closed top fluid filled column is set with one end in a fixed position while the other movable end, which is terminated with a membrane that exerts no force on the enclosed fluid except for that from atmospheric pressure, is placed upon any points within the range of the system or placed a fixed vertical distance from any points. Sensing the pressure difference at the fixed position end of fluid column gives a measure that is proportional to the vertical difference between points being measured. Using an electronic pressure sensor to measure pressure then enables the pressure differential to be converted to a readable display indicating the vertical distance between points, one point being a reference.

In an alternative application of the same invention, the system configuration is similar but, two fluid columns are used with the movable ends of the fluid columns being in line with, on opposite sides of, and positioned as equal distance from a movable point that is a fixed vertical distance from any point of interest, within the range of the system. In this application, the pressures at the top or closed end of the fluid columns are averaged and the resultant is again proportional to the vertical distance between points within the range of the system. One point is a reference and the relative vertical distance of other points is measured compared to it.

The specific objective of the invention is to advance the previous state of art to:
1) allow application on an excavator
2) improve accuracy
3) improve convenience of use
4) improve durability

BRIEF DESCRIPTION OF THE DRAWINGS

These and other aspects and advantages of the invention will become more apparent by reference to the following detailed description of an embodiment when considered in conjunction with the accompanying drawings, which are schematic diagrams and illustrations of a Vertical Measurement System incorporating the principles of the invention.

DETAILED DESCRIPTION

Figure 1:
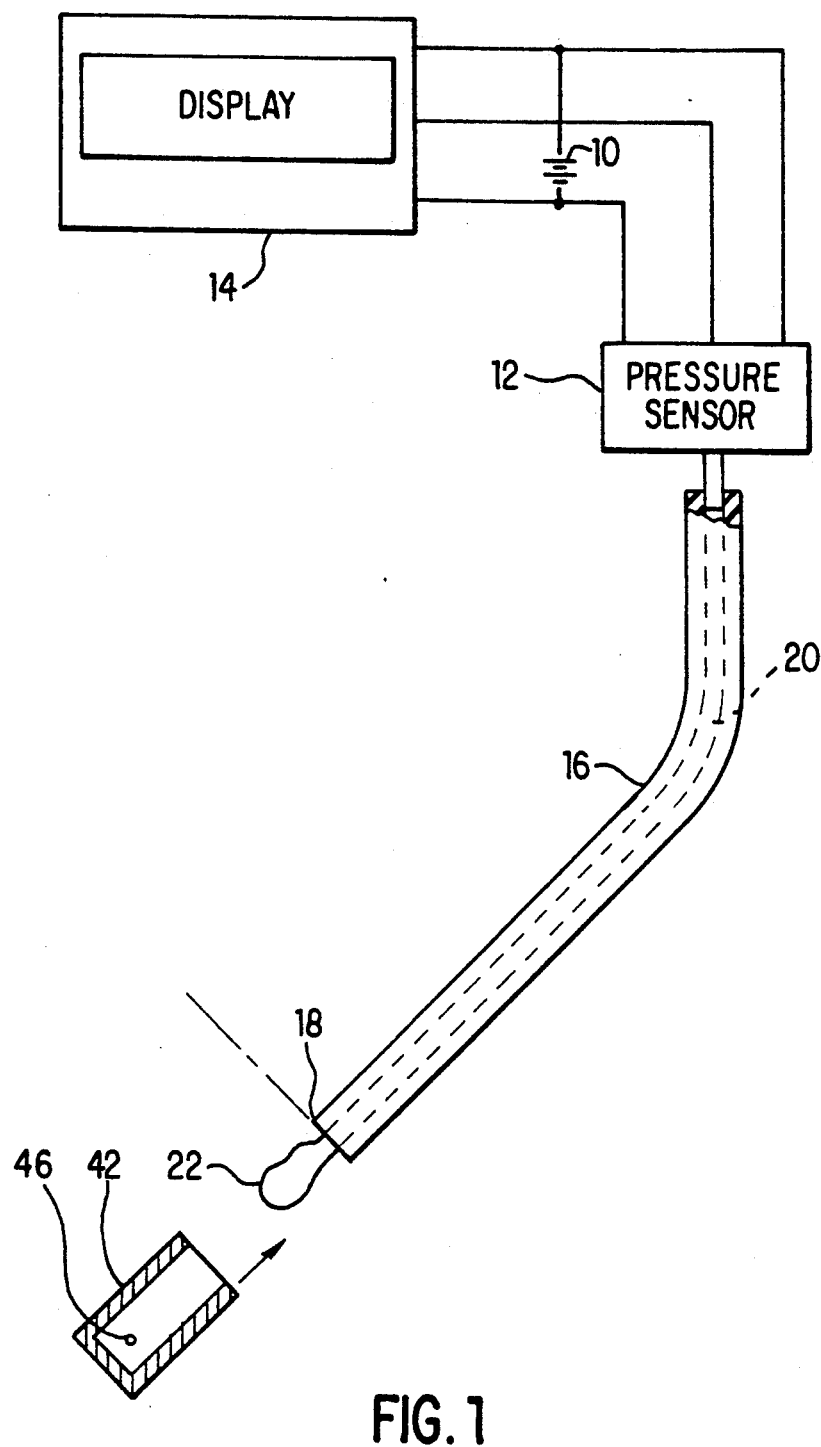
FIG. 1 is a basic schematic diagram of the Vertical Measurement System.
Figure 2:
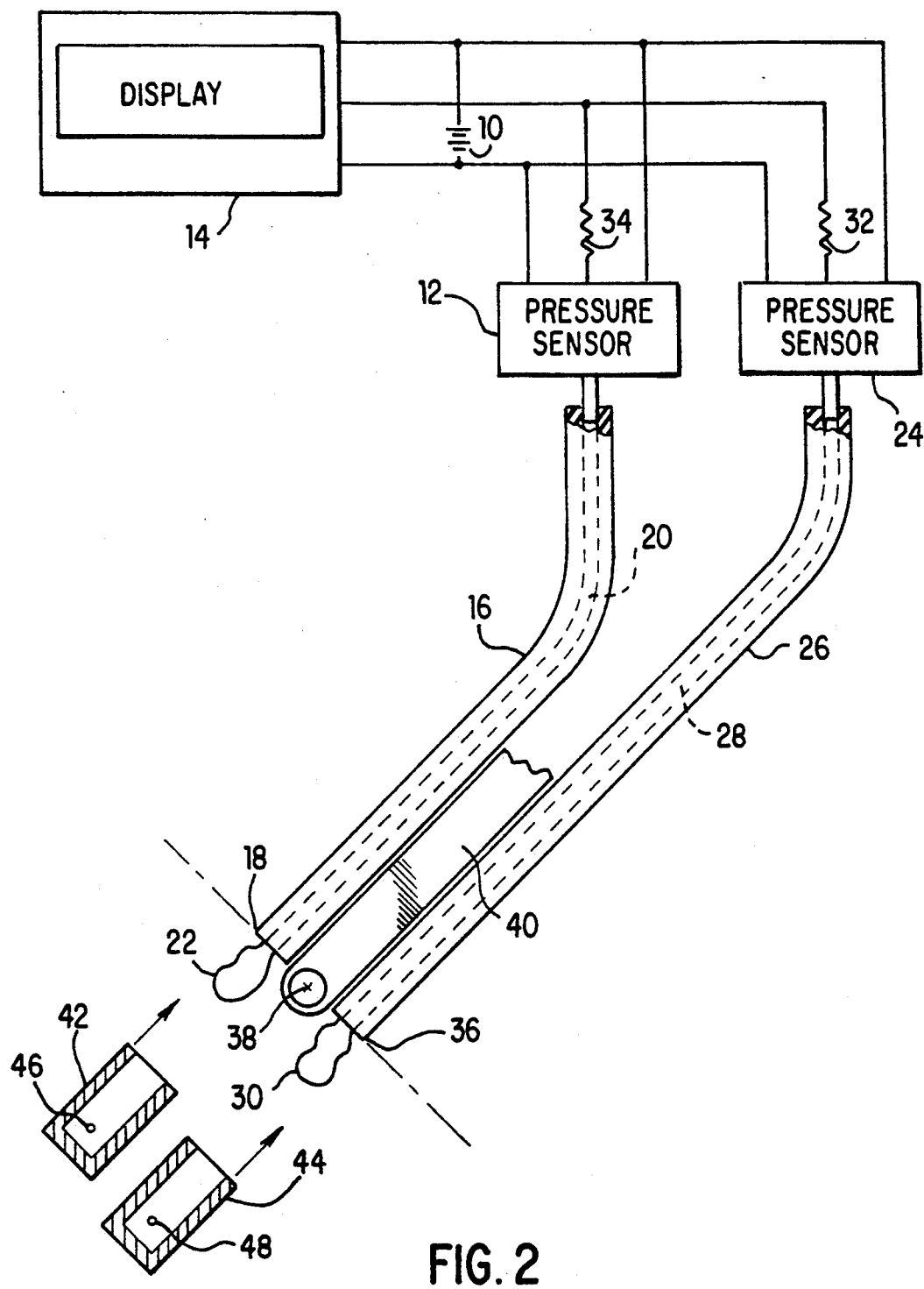
FIG. 2 is an alternative embodiment of the Vertical Measurement System also depicting a portion of an excavator or backhoe.

Referring to drawing FIG. #1, a Vertical Measurement System includes a direct current voltage source which may be conveniently provided by a conventional battery 10 or a regulated power supply each having positive and negative terminals. The negative terminal of the battery 10 is connected directly to ground. Further, the illustrated Measurement System includes an electronic Pressure Sensor 12 having three terminals, low voltage which is connected to system ground, high voltage which is connected to the positive terminal of the battery, and an output voltage terminal which is connected to electronic circuitry 14, detailed in drawing FIG. #3, that converts the pressure sensor output voltage to indicate a vertical measurement on the incorporated display. The electronic circuitry 14 also is connected to the battery 10 terminals. Also, the illustrated Measurement System includes a flexible, fluid 20 filled, columnar hose 16 having a metal protective wrap, also having a cross sectional area that does not significantly change when flexed or when subjected to an internal vacuum. One end of this hose is connected to the electronic pressure sensor port and the other end 18 terminated with a membrane 22 that contains the fluid 20 but exerts no force on the enclosed fluid except for atmospheric pressure. This membrane is protected by a cover 42 which is ported 46 to the atmosphere. The configuration of the cover is not critical and is best determined by the specific application.

The Vertical Measurement System generates a desired display which represents the vertical distance between any points within range of the system by having the movable end of the fluid column 18 placed upon a reference point or a fixed distance above it, then placed upon other points or a fixed distance above them. The electronic circuitry 14 converts the electronic pressure sensor output to a readable display which represents the vertical distance between any point and the reference point. The display is continuously updated with information from the electronic pressure sensor through the electronic circuitry. This is possible because it is not necessary to include a fluid value which must be opened to obtain data. The protective fluid valve used in prior art, can be eliminated because there is very little fluid movement in the system due to the relatively small fluid cavity of the electronic pressure sensor and the constant cross sectional area of the protective wire wrapped hose used to contain the fluid column. This embodiment of the Vertical Measurement System as applied to a backhoe or excavator is illustrated in FIGS. #6 and #7.

In an alternative embodiment of the invention illustrated in drawing FIGS. #2, #4 and #5, the Vertical Measurement System is applied to a backhoe 50 or excavator. In such an application the battery 10 is the conventional battery on the backhoe or excavator. Other components of the system are as previously described and shown in drawing #1 but it may be desirable to add a second electronic pressure sensor 24, hose 26, fluid 28, and membrane 30. When utilizing two electronic pressure sensors, it is also necessary to include an averaging network shown in drawing #2 by resistors of equal value 32 and 34 but not limited to such an averaging network. In this embodiment of the invention, the movable ends of the fluid columns 18 and 36 are in line with the center of the pin 38 that connects the bucket to the end of the backhoe or excavator stick 40. The ends of the fluid columns 18 and 36 are equidistant from the pin and protected by covers 42 and 48 which are ported 46 and 48 to the atmosphere. This arrangement gives a particular advantage in this preferred embodiment of the invention in that the center of the pin 38 is a fixed distance from points of interest that are to be measured. Pin 38 also requires free access during the course of operation by the backhoe or excavator operator. The design configuration illustrated in drawing FIGS. #2, #4 and #5, yields a system equivalent of having the movable end of a fluid column at the center of the pin without hampering free access to that pin.

Applied to a backhoe or excavator, the applicant's Vertical Measurement System satisfies the previously stated objectives in a unique manner.

Figure 7:
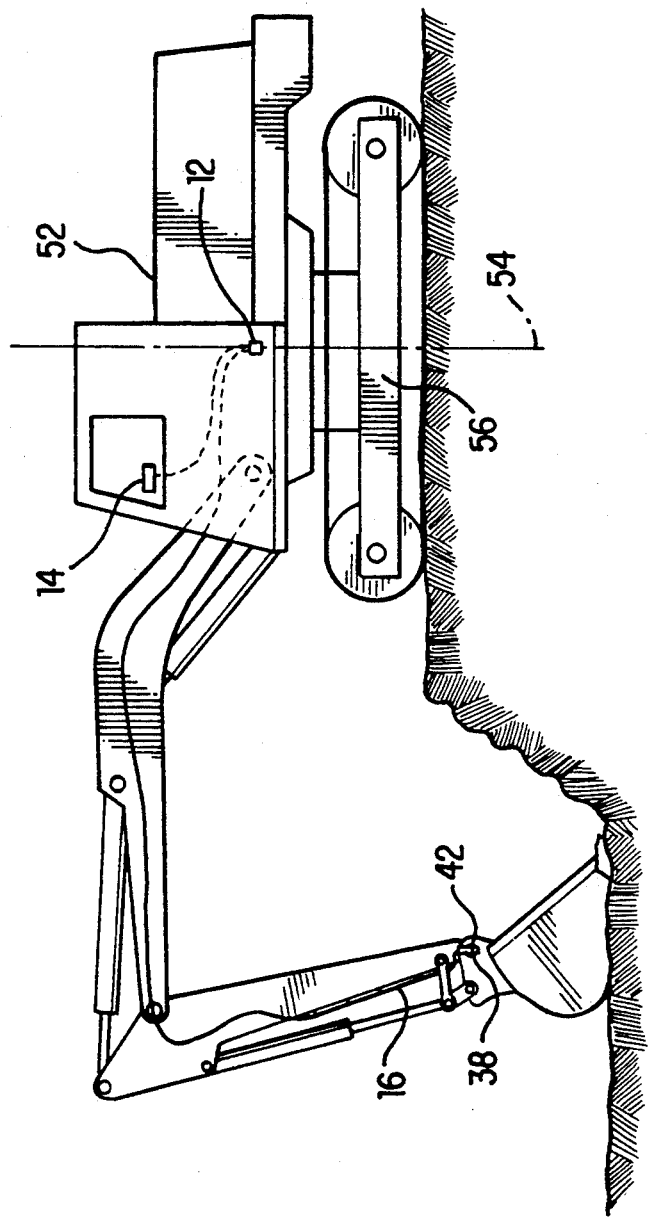
FIG. 7 is a side view diagram of an excavator with the applicant's Vertical Measurement System embodied in FIG. 1 attached.

1) The system can be utilized on a excavator illustrated in FIG. 7 by fixing the top of the fluid column(s) at a point directly above the excavator crawler swing pivot 54. As the excavator body 52 rotates over the stationary crawler frame 56, only points directly above the swing pivot 54 are a constant vertical distance from a reference point on the ground if the crawler frame is not level. Since in most instances the crawler frame is not level, the top of the flexible fluid filled column(s) must be mounted along a line passing through the excavator crawler swing pivot 54. Since this area is not readily seen by the excavator operator, a remote pressure sensing device 12 must be used atop the fluid filled column(s), remote from the system display 14. This prevents a mechanical dial indicator from being used on a excavator but the applicant's Vertical Measurement System easily addresses the condition by utilizing an electronic pressure sensor(s)12 and remote system display 14 shown in FIGS. #1 and #7. These same comments apply to the embodiment of the Vertical Measurement System shown in FIG. #2 as applied to an excavator.

2) The applicant's Vertical Measurement System improves accuracy over previous state of art by selecting a fluid to fill the flexible column that has characteristics which compliment the selected electronic pressure sensor. The low end operating range of the Vertical Measurement System (maximum depth of the movable end of the fluid filled column(s) below the fixed position closed top end) is equal to the vertical column of fluid supported by the minimum operating pressure of the selected electronic pressure sensor. The high end operating range of the Vertical Measurement System (maximum height of the movable end of the flexible column(s) above the fixed position end of the column(s)) is equal to the height of a vertical column of fluid supported by the maximum operating pressure of the electronic pressure sensor. Accuracy is improved by selecting a fluid that is dense, so as to accentuate pressure differences atop the column(s) while meeting the other necessary characteristics of the fluid (inertness, fluidity, low freezing point). Additionally a compatible electronic pressure sensor must be selected that has an operating range which yields a total system range of approximately 24 feet. Most backhoes and excavators have an excavation depth of 24 feet or less which dictates a total system range requirement of approximately 24 feet.

Absolute accuracy of the electronic pressure sensor is proportional to its full scale reading. Therefore accuracy is improved by selecting an electronic pressure sensor with an operating range as small as possible yet one that can satisfy the total system range requirement. The specific gravity of the selected fluid coupled with the operating range of the selected electronic pressure sensor therefor have a significant effect upon accuracy. Accuracy is also improved by incorporating a ratiometric design on the input to the analog to digital converter ADC1225CCJ in FIG. #3, also by using 9 bits of conversion with the analog to digital conversion of the output voltage of the electronic pressure sensor(s).

3) The system improves convenience of use in several ways:

a) The system display 14 is remote from the electronic pressure sensor(s) 12 and 24, allowing both to be located at optimum positions, the electronic pressure sensor(s) directly above the excavator crawler swing pivot 54 and the system display in easy and close visual contact with with the backhoe or excavator operator.

b) The display is alpha numeric, indicating distance in English (feet and inches) or Metric scales. The English scale is easy to comprehend since it displays feet and inches as opposed to tenths of feet.

c) Once a single calibration point is made to any reference point, such as a grade stake, the applicant's Vertical Measurement System offers the user a continuous display of the vertical position of the movable end of the flexible fluid filled column(s). As applied to a backhoe or excavator, the operator of that equipment initially calibrates the system by placing the bucket on any known reference point and adjusts R1 of FIG. 3 which is a panel mounted potentiometer to cause the display to indicate the known elevation. Note that "0 feet and 0 inches" can also be used as the reference elevation. After this initial adjustment, the display continuously indicates the vertical position of the bucket as long as the bucket angularity relative to vertical is maintained. If the backhoe or excavator is repositioned for further excavation, the initial calibration procedure is repeated but any reference point where the elevation is known can be used, including an excavated area that was previously measured with the system.

d) The applicant's system does not require a protective fluid valve because the electronic pressure sensor has a small fluid cavity compared to typical mechanical pressure gauges and because a protective wire wrapped hose is utilized to contain the fluid column, this hose having a relatively constant cross sectional area when flexed or when subjected to an internal vacuum. Unlike previous state of art designs, no valve must be opened or closed to obtain a reading. This improves convenience of use as well as accuracy by not introducing a variable that could effect fluid pressure.

4) The system inherently has improved durability over previous state of art electronic designs because the electronic pressure sensor(s) and the electronic circuitry associated with it is located in or on the body of the excavator 52 or backhoe 50, away from the rugged environment of the bucket or stick. The durability of the membrane is also improved in that essentially no fluid is displaced from the electronic pressure sensor to the membrane or vice versa. The membrane therefore has little flexing during operation.

When an embodiment of the invention is applied to a backhoe or excavator, the invention furnishes the operator of such equipment the vertical distance of the bucket above or below an established reference point. In a Vertical Measurement System constructed in accordance with this preferred embodiment of the invention illustrated in drawing FIG. #2, the following circuit components were found to yield satisfactory results:

Battery 10: 14 volts from the backhoe standard battery regulated to 5.1 volts with a National Semiconductor LM123AK voltage regulator plus filter capacitors Pressure Sensor 12 and 24: Fuji part number EP3445 with back side silicon sensing Electronic Circuitry 14: Intel TP87C51FA microcontroller, a Saronix 1.8432 MHz crystal oscillator, a National Semiconductor ADC1225CCJ A/D Converter, a National Semiconductor LM358A Operational Amplifier used to establish a reference voltage, a Futaba M20SDOICA Display Module, and various resistors, capacitors and switches shown in FIG. #3

Hose 16 and 26: a vinyl inner sheave with a ¼ inch inside diameter, protected by a wire wrap layer Fluid 20 and 28: Prestone Ethylene glycol based antifreeze coolant Membrane 22 and 30: Davol finger cot Resistor 32 and 34: 27000 ohm +1% ¼ watt Using these selected components the following total system range and accuracy can be predicted:

System range = $W/D \times (Rmax - Rmin)/100$ ]

where: W = the vertical column height of water supported by 1 atmosphere (100 KPa)
D = specific gravity of the fluid in the system
Rmax = the maximum operating pressure point of the selected electronic pressure sensor (KPa)
Rmin = the minimum operating pressure point of the selected electronic pressure sensor (KPa)

System range = [34 ft./1.11 × (100 − 20)/100]

System range = 24 feet, 6 inches

Accuracy = [Lerror × System range]

where: Lerror = the linearity error of the electronic pressure sensor
Accuracy = 24 ft. 6 in. × 0.5% maximum error
Accuracy = 1.5 inches maximum error
Note: Accuracy calculations are at a constant temperature.

Figure 3:
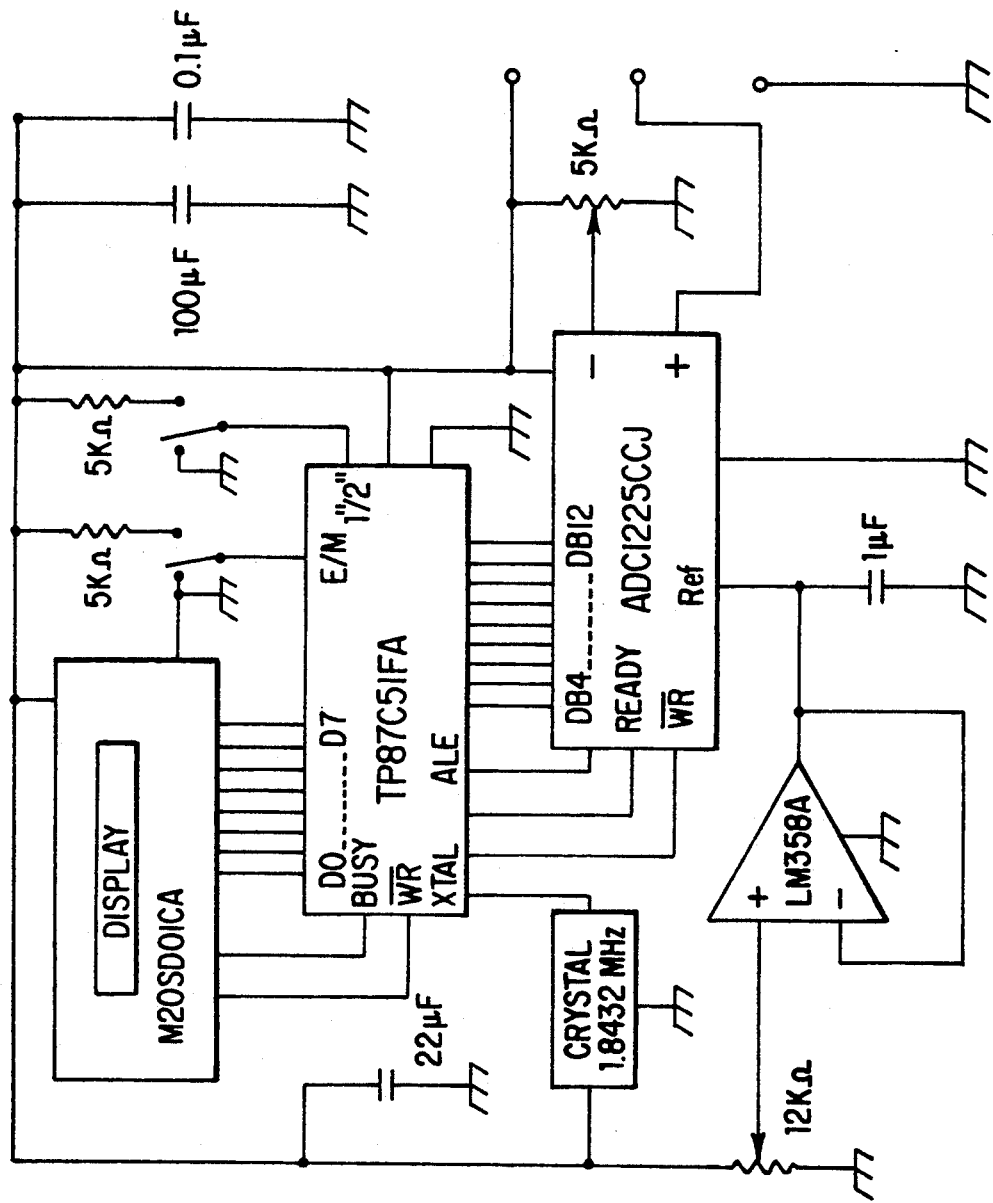
FIG. 3 is a schematic diagram of the electronic circuitry that converts the output voltage of the electronic pressure sensor(s) to a digital signal that drives the display module.
Figure 4:
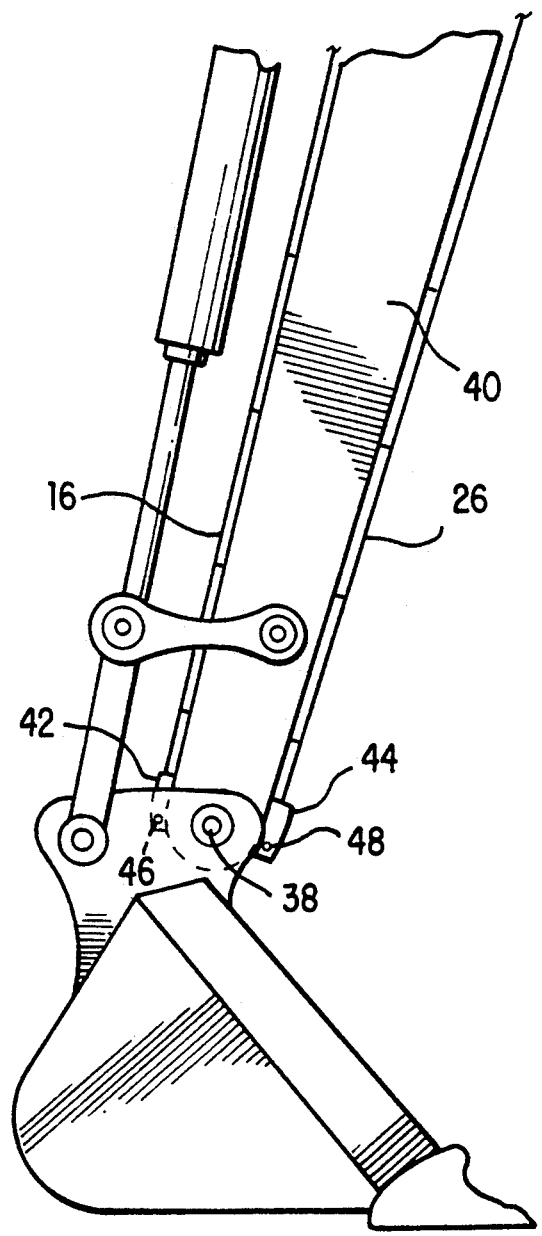
FIG. 4 is a side view of a backhoe or excavator stick and bucket with the applicant's Vertical Measurement System embodied in FIG. 2 attached.
Figure 5:
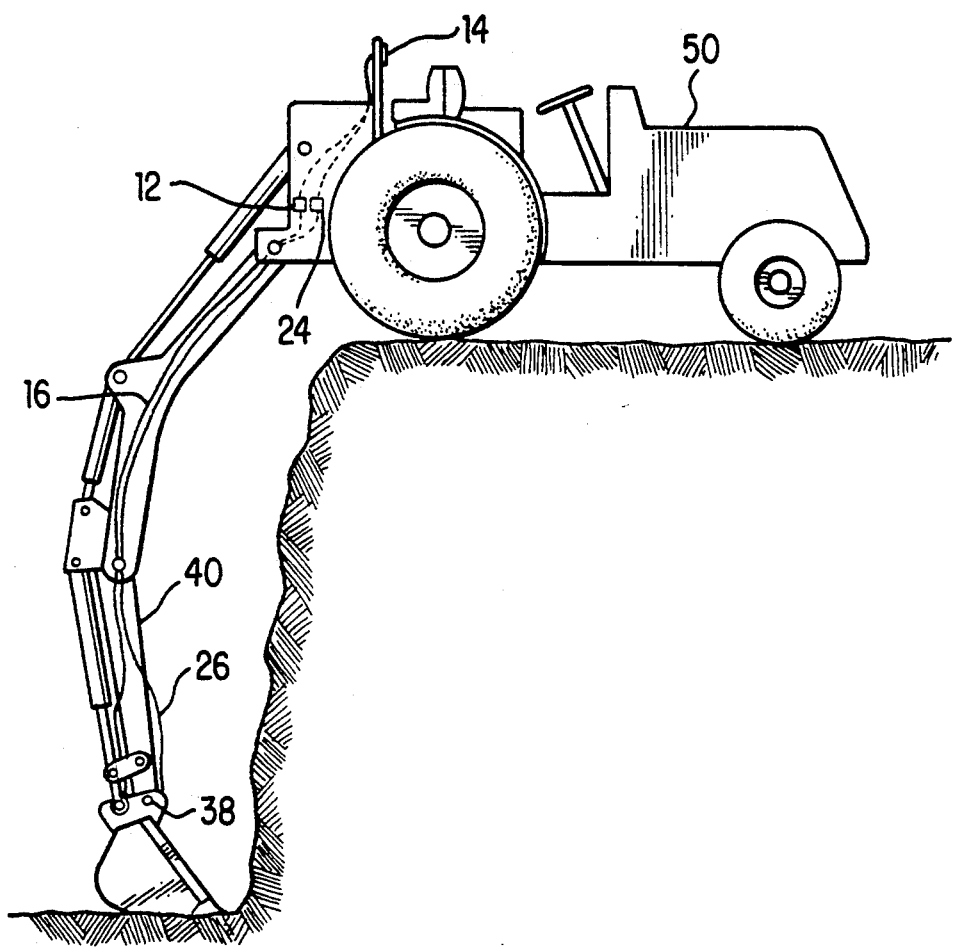
FIG. 5 is a side view diagram of a backhoe with the applicant's Vertical Measurement System embodied in FIG. 2 attached.
Figure 6:
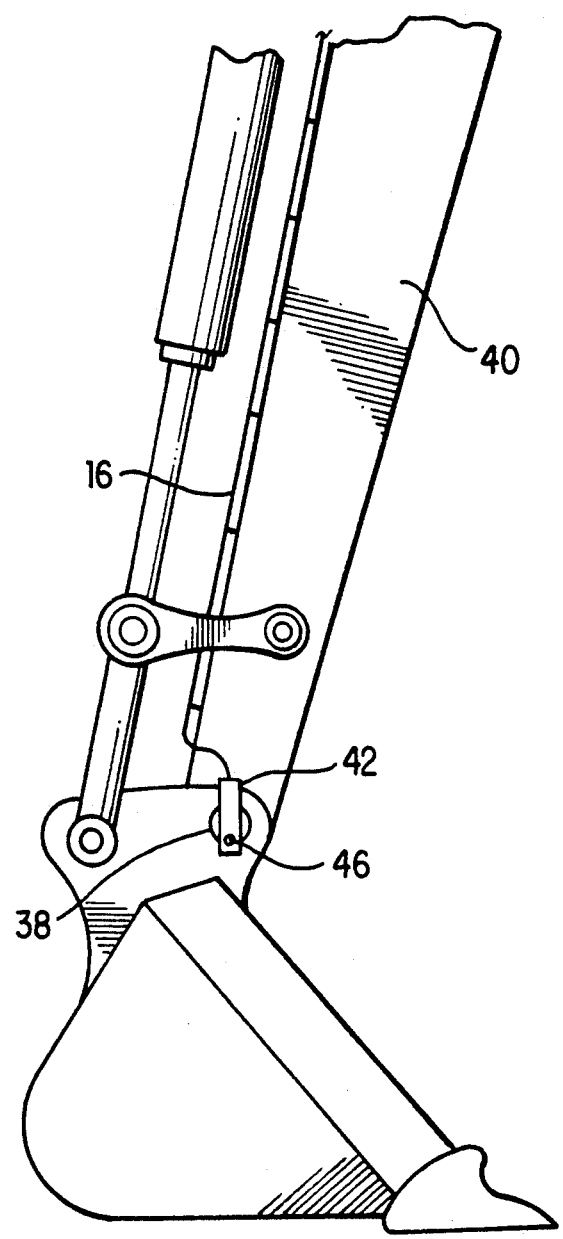
FIG. 6 is a side view of a backhoe or excavator stick and bucket with the applicant's Vertical Measurement System embodied in FIG. 1 attached.

Other factors that could negatively affect accuracy are minimized and are not significant in the applicant's Vertical Measurement System. Factors such as:

Voltage sensitivity is minimized by use of a ratiometric design as shown in FIG. 3.

Analog to digital conversion error is minimized by using 9 bits of conversion as shown in FIG. 3.

Hysteresis is minimized by eliminating trapped air in the fluid filled column. Response time is also improved by eliminating all air from the fluid filled column.

It will now be readily appreciated that the invention provides a Vertical Measurement System which is particularly, though not exclusively, applicable to backhoes or excavators. However, it is to be understood that the preferred embodiment of the invention disclosed herein is shown for illustrative purposes only and that various modifications and alterations may be made thereto without departing from the spirit and scope of the invention.

What is claimed is:

1. An improved device to measure vertical distances where direct measurements are not possible or convenient, with such measurements being continuously displayed without requiring the opening or closing of a valve, and such measurements made by a Vertical Measurement System comprising: a voltage source; an electronic pressure sensor; a flexible fluid filled column which is terminated at one end thereof at the electronic pressure sensor this being the higher position end and terminated at an opposite and lower position end thereof with a membrane containing the enclosed fluid but exerting no force on the fluid except for atmospheric pressure; and electronic circuitry capable of converting the output voltage from the electronic pressure sensor into a readable display representing the relative vertical position of the end of the fluid filled column which is terminated with the membrane.

2. A Vertical Measurement System comprising: all that is claimed in claim 1 plus an additional electronic pressure sensor; an additional flexible fluid filled column which is terminated at one end thereof at the electronic pressure sensor this being the higher position and terminated at an opposite and lower position end with a membrane containing the enclosed fluid but exerting no force on the fluid except for atmospheric pressure; and an averaging network that connects the output voltages of the two electronic pressure sensors to electronic circuitry which is capable of converting the averaged output voltage of the electronic pressure sensors into a readable display representing the theoretical position of a mid point between the ends of the flexible fluid filled columns which are terminated with the membranes.

3. An improved device applied to backhoes or excavators, to measure the vertical position of a bucket, with such measurements being continuously displayed without requiring the opening or closing of a valve, and such measurements made by a Vertical Measurement System comprising: an electronic pressure sensor; a flexible fluid filled column which is adhered to a boom and stick of the backhoe or excavator and which is terminated at one end thereof at the electronic pressure sensor this being the higher position end and for excavators, this end located above the excavator crawler swing pivot, and terminated at an opposite and lower position end thereof with a membrane containing the enclosed fluid but exerting no force on the fluid except for atmospheric pressure, and this lower end positioned on the stick or bucket of the backhoe or excavator such that meaningful data which is proportional to the vertical height of the fluid column is generated by the electronic pressure sensor; and electronic circuitry capable of converting the output voltage of the electronic pressure sensor into a readable display representing the relative vertical position of a bucket, for the convenience of an operator of the backhoe or excavator.

4. An improved device applied to backhoes or excavators, to measure the vertical position of a bucket with such measurements being continuously displayed without requiring the opening or closing of a valve, and such measurements made by a Vertical Measurement System comprising: two electronic pressure sensors; two flexible fluid filled columns which are adhered to a boom and stick of the backhoe or excavator, each terminated at one end thereof at an electronic pressure sensor, this being the higher position end and for excavators, this end located above the excavator crawler swing pivot, and each terminated at an opposite and lower position end thereof with a membrane containing the enclosed fluid but exerting no force on the fluid except for atmospheric pressure, and the lower ends of the two fluid filled columns positioned on the stick of the backhoe or excavator directly in line and on opposite sides of the main pin that fastens a bucket to that stick, such that meaningful data which is proportional to the vertical height of the fluid columns is generated by the two electronic pressure sensors; and an averaging network that connects the output voltages of the two electronic pressure sensors to electronic circuitry capable of converting the averaged output voltage of the electronic pressure sensors into a readable display representing the relative vertical position of a bucket, for the convenience of an operator of the backhoe or excavator.

5. An improved device applied to backhoes or excavators, to measure the vertical position of a bucket, with such measurements being continuously displayed without requiring the opening or closing of a valve, and such measurements made by a Vertical Measurement System comprising: an electronic pressure sensor having an operating range of approximately 20 KPa to 100 KPa a flexible fluid filled column with a wire wrapped wall, the specific gravity of the fluid being approximately 10% to 15% greater than water, and the fluid column adhered to a boom and stick of the backhoe or excavator, one end of such fluid filled column terminated at the electronic pressure sensor this being the higher position end and for excavators, this end located above the excavator crawler swing pivot, and terminated at an opposite and lower position end thereof with a membrane containing the enclosed fluid but exerting no force on the fluid except for atmospheric pressure, and this lower end positioned on the stick or bucket of the backhoe or excavator such that meaningful data which is proportional to the vertical height of the fluid column is generated by the electronic pressure sensor; and microcontroller based circuitry, using an analog to digital converter with more than eight bit conversion, for the purpose of converting the output voltage of the electronic pressure sensor into an alpha numeric display representing the relative vertical position of a bucket, for the convenience of an operator of the backhoe or excavator.

6. An improved device applied to backhoes or excavators, to measure the vertical position of a bucket, with such measurements being continuously displayed without requiring the opening or closing of a valve, and such measurements made by a Vertical Measurement System comprising: all that is claimed in claim 5 plus an additional electronic pressure sensor having an operating range of approximately 20 KPa to 100 KPa; an additional flexible fluid filled column with a wire wrapped wall, the specific gravity of the fluid being approximately 10% to 15% greater than water, and the fluid column adhered to a boom and stick of the backhoe or excavator, one end of such fluid column terminated at the electronic pressure sensor this being the higher position end and for excavators, this end located above the excavator crawler swing pivot, and terminated at an opposite and lower position end thereof with a membrane containing the enclosed fluid but exerting no force on the fluid except for atmospheric pressure, and the lower ends of the two fluid filled columns positioned on the stick of the backhoe or excavator directly in line and on opposite sides of the main pin that fastens a bucket to that stick, such that meaningful data which is proportional to the vertical height of the fluid columns is generated by the electronic pressure sensors; and an averaging network that connects the output voltages of the two electronic pressure sensors to microcontroller based circuitry, using an analog to digital converter with more than eight bit conversion, for the purpose of converting the averaged output voltage of the electronic pressure sensors into an alpha numeric display representing the relative vertical position of a bucket, for the convenience of an operator of the backhoe or excavator.

* * * * *